US008218179B2

(12) United States Patent  
Nakajima

(10) Patent No.: US 8,218,179 B2  
(45) Date of Patent: Jul. 10, 2012

(54) PLURALITY OF TERMINAL DEVICES, IMAGING FORMING APPARATUS AND SYSTEM FOR COMMUNICATING IMAGE DATA BASED ON REGISTRATION DATA

(75) Inventor: Koki Nakajima, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 791 days.

(21) Appl. No.: 12/313,654

(22) Filed: Nov. 21, 2008

(65) Prior Publication Data

US 2009/0225352 A1    Sep. 10, 2009

(30) Foreign Application Priority Data

Mar. 5, 2008  (JP) ................................ 2008-055559

(51) Int. Cl.
*G06F 3/12*  (2006.01)
(52) U.S. Cl. ......... 358/1.15; 705/41; 709/203; 713/168; 713/169

(58) Field of Classification Search .................. 358/1.15
See application file for complete search history.

(56) References Cited

U.S. PATENT DOCUMENTS

| 2005/0097790 | A1* | 5/2005 | Sawada .......................... 235/487 |
| 2005/0195446 | A1* | 9/2005 | Kasatani ........................ 358/402 |
| 2007/0162748 | A1* | 7/2007 | Okayama et al. ............. 713/165 |
| 2008/0002224 | A1* | 1/2008 | Tanimoto ...................... 358/1.15 |

FOREIGN PATENT DOCUMENTS

| JP | 6-233015 | 8/1994 |
| JP | 2006-113721 | 4/2006 |
| JP | 2007-306383 | 11/2007 |

* cited by examiner

*Primary Examiner* — Benny Q Tieu  
*Assistant Examiner* — Juan Guillermety  
(74) *Attorney, Agent, or Firm* — Jordan and Hamburg LLP

(57) ABSTRACT

An information processing system facilitates an operation performed on an information processor when data is to be transmitted from the information processor to a terminal device, and an information processor and a terminal device that can be used for the information processing system are provided.

16 Claims, 4 Drawing Sheets

[FIG. 1]
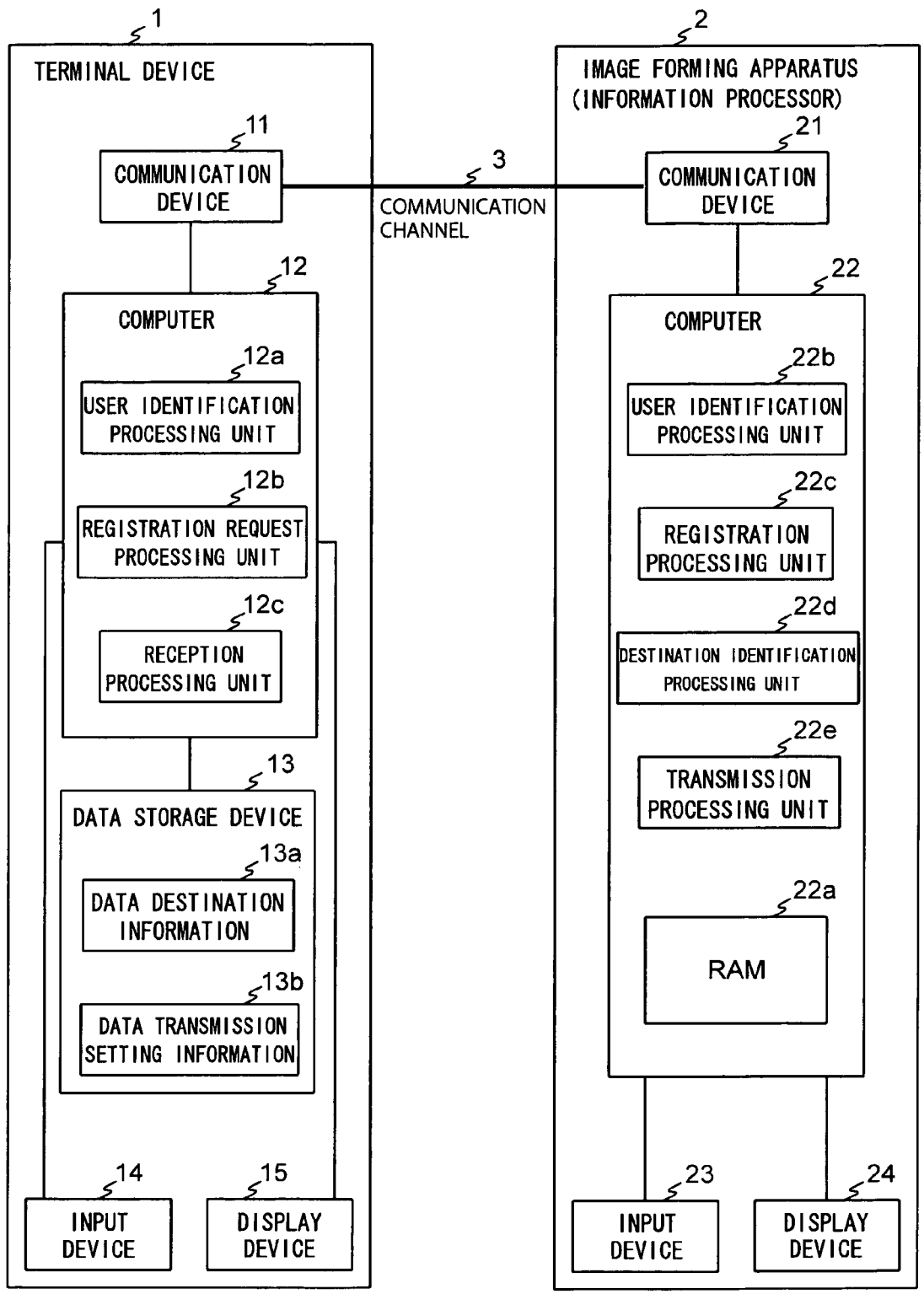

[FIG. 2]
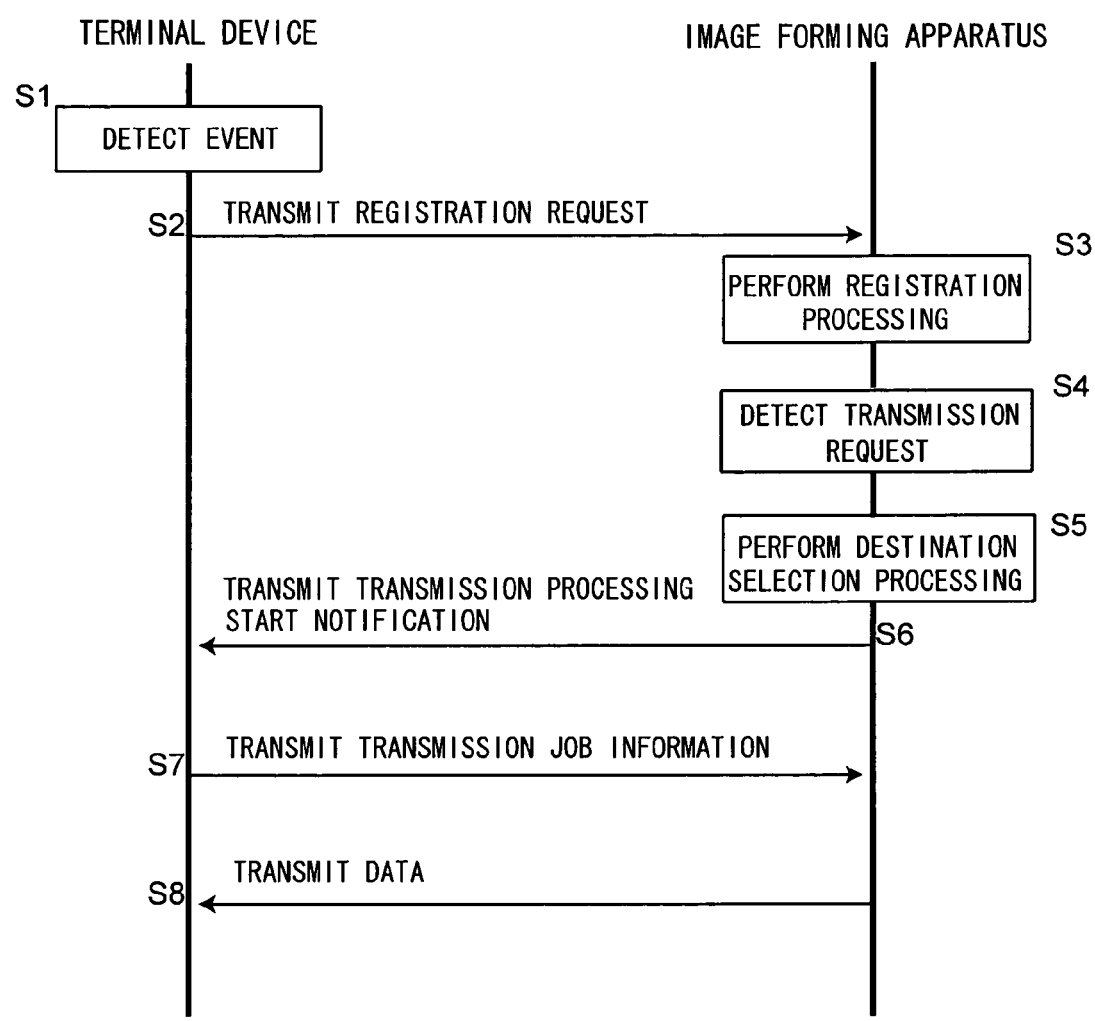

[FIG. 3]

| USER ID | LOGIN TERMINAL INFORMATION | SHARED USER INFORMATION |
|---|---|---|
| a0001 | 192.168.0.10 | a0010, b0008 |
| a0002 | 192.168.0.5 | a0001, b0008 |
| ... | ... | ... |
| b0026 | 192.168.0.8 | a0001 |

[FIG. 4]

| DESTINATION USER | DESTINATION TERMINAL |
|---|---|
| a0001 | 192.168.0.10 |
| a0002 | 192.168.0.5 |
| b0026 | 192.168.0.8 |

PLURALITY OF TERMINAL DEVICES, IMAGING FORMING APPARATUS AND SYSTEM FOR COMMUNICATING IMAGE DATA BASED ON REGISTRATION DATA

INCORPORATION BY REFERENCE

This application is based upon and claims the benefit of priority from the corresponding Japanese Patent Application No. 2008-055559, filed Mar. 5, 2008, the entire contents of which is incorporated herein by reference.

BACKGROUND OF THE INVENTION

1. Field of the Invention

The present invention relates to an information processing system, an information processor, and a terminal device.

2. Description of the Related Art

There exists a facsimile device in which a pair of arbitrary number and destination information is stored in a memory, and data is transmitted to a destination identified by the destination information. The facsimile device, in which the arbitrary number is displayed on an abbreviated dialing button or in the vicinity thereof, allows a user thereof to perform specification of the destination by depressing only the abbreviated dialing button without bothering to input the destination information. If the facsimile device is used by a plurality of users, abbreviated dialing buttons necessary for all of the users need to be registered, which increases the number of abbreviated dialing buttons. In some cases, several tens of abbreviated dialing buttons may be necessary. Therefore, it may be difficult for a user to find a desired abbreviated dialing button when the user specifies the destination.

SUMMARY OF THE INVENTION

The present invention teaches and claims an information processing system that facilitates an operation performed on an information processor when data is to be transmitted from the information processor to a terminal device, and an information processor and a terminal device that can be used for the information processing system.

According one aspect of the present invention, there is provided an information processing system, comprising: an information processor; and one or a plurality of terminal devices that can communicate with the information processor. The terminal device includes: a first user identification processing unit for identifying a user who is operating the terminal device; a registration request processing unit for transmitting to the information processor: a registration request for data destination information indicating another user that is permitted to set the user identified by the first user identification processing unit as a destination of data originated from the information processor; and user identification information of the user identified by the first user identification processing unit; and a reception processing unit for receiving the data from the information processor. The information processor includes: a registration processing unit for receiving the data destination information and the user identification information, and retaining the data destination information in association with the user identification information; a second user identification processing unit for identifying a user who is operating the information processor; a display device for displaying a user list based on the user identification information associated with the data destination information including the user identified by the second user identification processing unit; an input device for detecting an operation for selecting a user to be the destination of the data from the user list; a destination identification processing unit for identifying as the destination of the data the terminal device that has transmitted the user identification information of the user identified based on the operation; and a transmission processing unit for transmitting the data to the terminal device identified by the destination identification processing unit.

According to an another embodiment of the present invention, there is provided an information processor which can communicate with one or a plurality of terminal devices, comprising: a registration processing unit for receiving a registration request for data destination information indicating another user that is permitted to set a given user as a destination of data originated from the information processor and user identification information of the given user, and retaining the data destination information in association with the user identification information; a user identification processing unit for identifying a user who is operating the information processor; a display device for displaying a user list based on the user identification information associated with the data destination information including the user identified by the user identification processing unit; an input device for detecting an operation for selecting a user to be the destination of the data from the user list; a destination identification processing unit for identifying as the destination of the data the terminal device that has transmitted the user identification information of the user identified based on the operation; and a transmission processing unit for transmitting the data to the terminal device identified by the destination identification processing unit.

According to yet another embodiment of the present invention, there is provided a terminal device which can communicate with an information processor, comprising: a user identification processing unit for identifying a user who is operating the terminal device; a registration request processing unit for transmitting to the information processor: a registration request for data destination information indicating another user that is permitted to set the user identified by the user identification processing unit as a destination of data originated from the information processor; and user identification information of the user identified by the user identification processing unit; and a reception processing unit for receiving the data from the information processor.

Other objects of the present invention and specific advantages obtained by the present invention will become clearer by the following description of embodiments.

BRIEF DESCRIPTION OF THE DRAWINGS

In the accompanying drawings:

FIG. 1 is a block diagram showing a configuration of an information processing system according to embodiment of the present invention;

FIG. 2 is a diagram for explaining an operation of each device included in the information processing system of FIG. 1;

FIG. 3 is a diagram showing an example of data destination information that is transmitted from a plurality of terminal devices according to embodiment of the present invention and retained in an image forming apparatus; and FIG. 4 is a diagram showing an example of a user list displayed on the image forming apparatus included in the information processing system of FIG. 1.

DETAILED DESCRIPTION OF THE PREFERRED EMBODIMENTS

Hereinafter, embodiments according to the present invention are described by referring to the accompanying drawings.

(First Embodiment)

FIG. 1 is a block diagram showing a configuration of an information processing system according to embodiment of the present invention.

In the information processing system shown in FIG. 1, a terminal device 1 and an image forming apparatus 2 (information processor) can communicate with each other via a communication channel 3. FIG. 1 shows only one terminal device 1, but may show a state where a plurality of terminal devices 1 and the image forming apparatus 2 can communicate with each other. Image data generated by the image forming apparatus 2 is transmitted to any one of the terminal devices 1. Examples of the terminal device 1 include a personal computer. Examples of the image forming apparatus 2 include a multifunction peripheral (MFP) having a facsimile transmission/reception function, a copy function, and a print function.

The terminal device 1 includes a communication device 11, a computer 12, a data storage device 13, an input device 14, and a display device 15.

The communication device 11 represents a device that can communicate with the image forming apparatus 2 via the communication channel 3. If the communication channel 3 is a computer network, for example, a network interface is used as the communication device 11. If the communication channel 3 is a telephone line, for example, a modem is used as the communication device 11.

The computer 12 represents a processor including a CPU (not shown), a ROM (not shown), a RAM (not shown), and a recording medium (not shown) such as a hard disk drive, and for implementing various processing units by executing computer programs stored in the ROM, the recording medium, and the like. On the terminal device 1, the computer 12 implements a user identification processing unit 12a, a registration request processing unit 12b, and a reception processing unit 12c.

The user identification processing unit 12a represents a processing unit for identifying a user who is operating the terminal device 1 based on a user's operation performed on the input device 14. For example, the user identification processing unit 12a identifies a user based on a user ID that is input at a time of logging in to an operating system, a user ID that is input at a time of single sign-on, and the like. Note that the user ID may be read from an IC card by an IC card reader constituting the input device 14. Alternatively, the user identification processing unit 12a may identify the user based on the user's biometric information (such as fingerprint) instead of the user ID that is text information.

The registration request processing unit 12b represents a processing unit for controlling the communication device 11 to transmit to the image forming apparatus 2 the user ID of a user identified by the user identification processing unit 12a and a registration request for data destination information. The registration request contains data destination information 13a. The data destination information 13a represents information indicating another user that is permitted to set the user identified by the user identification processing unit 12a as a destination of data originated from the image forming apparatus 2. The data destination information 13a includes the user ID of another user selected by the user. For example, another user is selected from a list provided by a server (not shown), or identified based on the user ID input by the user.

The reception processing unit 12c represents a processing unit for controlling the communication device 11 to receive data from the image forming apparatus 2.

The data storage device 13 represents a device for storing various data, computer programs, and the like. The data storage device 13 stores the data destination information 13a and data transmission setting information 13b, which are preset. Used as the data storage device 13 is a hard disk drive or the like. The data transmission setting information 13b includes information used when data is transmitted from the image forming apparatus 2 to the terminal device 1, the information including an image quality (resolution) of an original corresponding to the data, a file format, a size of the original, and a color thereof.

The input device 14 represents a device for detecting the user's operation and outputting an electrical signal corresponding to the user's operation. Used as the input device 14 is, for example, a keyboard, a mouse, and an IC card reader. The display device 15 represents a device for displaying various information. Used as the display device 15 is, for example, a liquid crystal display.

In addition, the image forming apparatus 2 includes a communication device 21, a computer 22, an input device 23, and a display device 24.

The communication device 21 represents a device that can communicate with the terminal device 1 via the communication channel 3. If the communication channel 3 is a computer network, for example, a network interface is used as the communication device 21. If the communication channel 3 is a telephone line, for example, a modem is used as the communication device 21.

The computer 22 represents a processor including a RAM 22a, a CPU (not shown), a ROM (not shown), and a recording medium (not shown) such as a hard disk drive, and for implementing various processing units by executing computer programs stored in the ROM, the recording medium, and the like. On the image forming apparatus 2, the computer 22 implements a user identification processing unit 22b, a registration processing unit 22c, a destination identification processing unit 22d, and a transmission processing unit 22e.

The user identification processing unit 22b represents a processing unit for identifying a user who is operating the image forming apparatus 2. For example, the user identification processing unit 22b acquires the user ID read from an IC card owned by the user by an IC card reader constituting the input device 23. Note that the user identification processing unit 22b may identify the user based on the user's biometric information (such as fingerprint) instead of the user ID that is text information.

The registration processing unit 22c represents a processing unit for receiving the registration request for the data destination information 13a and the user ID, and retaining the data destination information 13a in the RAM 22a in association with the user ID. Only data destination information for which the registration request is made after startup of the information processor is registered in the volatile memory, which eliminates the need for using an expensive nonvolatile memory to retain the data destination information.

The destination identification processing unit 22d represents a processing unit for generating a user list based on the user ID associated with one or a plurality of items of data destination information 13a including a user identified by the user identification processing unit 22b, and identifying the terminal device 1 of a user selected from the user list as a destination of the data. The user list includes as necessary a user ID, a user name, an identification information of the terminal device 1 that has transmitted the user ID, a name of the terminal device 1 that has transmitted the user ID. The user list is displayed by the display device 24, from which the user to be set as the destination is identified based on the user's operation performed on the input device 23.

The transmission processing unit 22e represents a processing unit for transmitting the data to the terminal device 1 identified by the destination identification processing unit 22d.

The input device 23 represents a device for detecting the user's operation and outputting an electrical signal corresponding to the user's operation. Used as the input device 23 is, for example, a key switch, a touch panel mounted on a screen of the display device 24, and an IC card reader. The display device 24 represents a device for displaying various information. Used as the display device 24 is, for example, a liquid crystal display. The input device 23 and the display device 24 are mounted to a casing of the image forming apparatus 2 as, for example, an operation panel.

Next, description will be made of an operation of each device included in the information processing system. FIG. 2 is a diagram for explaining the operation of each device included in the information processing system of FIG. 1.

When such a predetermined event is detected at a time instant when the user ID is acquired by the user identification processing unit 12a at a time of login or sign-on or a time instant when the computer program for implementing the registration request processing unit 12b is executed (Step S1), the registration request processing unit 12b of the terminal device 1 transmits the user ID and the registration request for the data destination information to the image forming apparatus 2 (Step S2).

Upon reception of the user ID and the registration request for the data destination information, the registration processing unit 22c of the image forming apparatus 2 retains the user ID and the data destination information 13a in the RAM 22a in association with each other (Step S3).

Thus registered in the image forming apparatus 2 is the data destination information 13a transmitted from one or a plurality of terminal devices 1. FIG. 3 is a diagram showing an example of the data destination information 13a that is transmitted from the plurality of terminal devices 1 and retained in the image forming apparatus 2 in the information processing system of FIG. 1. In the example of FIG. 3, the data destination information 13a transmitted from three terminal devices 1 is registered. The registered data destination information 13a includes the user ID "a0001" and the user IDs "a0010" and "b0008" of other users (hereinafter, referred to as "shared user information") included in the data destination information 13a, which are received from the terminal device 1 indicated by the IP address "192.168.0.10". Hereinafter, the identification information of the terminal device 1 that has transmitted the data destination information 13a will be referred to as "login terminal information".

On the other hand, when the user is to use the image forming apparatus 2, the user presents his/her IC card to input the user ID to the image forming apparatus 2. The user identification processing unit 22b of the image forming apparatus 2 acquires the user ID from the input device 23. This allows the user to use the image forming apparatus 2. On the image forming apparatus 2, for example, based on the user's operation, image data is generated by image reading, or image data is generated based on the received facsimile signal. The generated image data is stored in the RAM 22a or a data storage device (such as hard disk drive) (not shown).

Subsequently, when a transmission request to transmit the data to the terminal device 1 occurs based on an operation performed by the user identified by the user identification processing unit 22b, the destination identification processing unit 22d detects the transmission request (Step S4), and performs a destination selection processing for the data (Step S5). In the destination selection processing, the destination identification processing unit 22d identifies the user ID of the user, identifies the data destination information 13a having shared user information including the user ID from among the data destination information 13a retained in the RAM 22a, and reads the user ID and the login terminal information that are associated with the identified data destination information 13a. After that, the destination identification processing unit 22d causes the display device 24 to display the read one or a plurality of sets of the user ID and the login terminal information as a user list, and then, upon detection of a selection operation performed by the user on the input device 23, identifies the user ID and the login terminal information that are selected from the user list. Note that the user list also includes information (user ID and login terminal information) on the user identified by the user identification processing unit 22b.

FIG. 4 is a diagram showing an example of the user list displayed on the image forming apparatus 2 of FIG. 1. The user list shown in FIG. 4 is displayed when the user indicated by the user ID "a0001" is identified by the user identification processing unit 22b in a case where the data destination information 13a and the like are retained as shown in FIG. 3. In FIG. 3, the user IDs "a0002" and "b0026" are associated with the shared user information including the user ID "a0001", and hence the user list shown in FIG. 4 includes the identification information (the above-mentioned login terminal information) of the terminal devices 1 used by the users indicated by the user IDs "a0001", "a0002", and "b0026" in order to show the terminal devices 1 that can be selected as the destination.

If the terminal device 1 to be the destination of the data is thus identified by the destination identification processing unit 22d, the transmission processing unit 22e transmits a notification of a start of a transmission processing for the data to the terminal device 1 (Step S6). Upon reception of the notification, the reception processing unit 12c of the terminal device 1 generates transmission job information, and transmits the transmission job information including the data transmission setting information 13b to the transmission processing unit 22e of the image forming apparatus 2 (Step S7). Upon reception of the transmission job information, the transmission processing unit 22e of the image forming apparatus 2 edits the data to be transmitted so as to be compliant with setting information specified by the data transmission setting information 13b, and transmits the edited data to the reception processing unit 12c of the terminal device 1 via a communication method that is specified by the data transmission setting information 13b (Step S8). The data to be transmitted may be generated so as to be compliant with the data transmission setting information 13b after reception of the data transmission setting information 13b. In a case of image data, the Tool Without An Interesting Name (TWAIN), the Web Services for Devices-Scan (WSD-SCAN), or the like is specified as the communication method. The reception processing unit 12c of the terminal device 1 receives the data, and stores the data into, for example, the data storage device 13.

As described above, according to the first embodiment, a destination unnecessary for the user operating the image forming apparatus 2 is not included in the user list, which reduces the number of items within the user list, thereby facilitating an operation for selecting a desired destination. It is thus possible to make it easy to operate the image forming apparatus 2 when data is transmitted from the image forming apparatus 2 to the terminal device 1. In addition, it is possible to facilitate an input operation upon user authentication by performing the user authentication through an IC card on the image forming apparatus 2. Further, since the number of items within the user list is small, there is no need for using a large-size screen for the display device 24.

Further, according to the first embodiment, it is possible to input settings by using a user interface superior in operability on the terminal device 1 without using a user interface inferior in operability on the image forming apparatus 2. Further, if the input operation for settings is previously performed once on the terminal device 1, which saves the setting information for data transmission, there is no need for inputting the setting information every time the data is transmitted. For example, in a case where the image forming apparatus 2 is a scanner, there exist a large number of setting items for image reading, and hence the effect is remarkably produced. Note that the setting information may be set to be different dependent on a service (facsimile reception, image reading, or the like) provided by the image forming apparatus 2.

(Second Embodiment)

In an information processing system according to a second embodiment of the present invention, in addition to the operations performed in the information processing system according to the first embodiment, the registration request processing unit 12b of the terminal device 1 transmits the user ID and a registration deletion request upon detection of a predetermined event, and upon reception of the user ID and the registration deletion request, the registration processing unit 22c of the image forming apparatus 2 deletes the user ID and the data destination information 13a from the RAM 22a. When logout, sign-off, or the like is detected by the user identification processing unit 12a, the registration request processing unit 12b of the terminal device 1 transmits the user ID and the registration deletion request at an end of the computer program for implementing the registration request processing unit 12b.

As described above, according to the second embodiment, if the terminal device 1 does not receive data, the data destination information registered in the image forming apparatus 2 is deleted, with the result that less unnecessary destinations are included in the user list.

(Third Embodiment)

In the information processing system according to a third embodiment of the present invention, in addition to the operations performed in the information processing system according to the first or second embodiment, the registration processing unit 22c of the image forming apparatus 2 repeatedly transmits a confirmation request to confirm effectiveness of each item of the data destination information 13a retained in the RAM 22a to the registration request processing unit 12b of the terminal device 1 on a regular basis.

The registration processing unit 22c of the image forming apparatus 2 transmits the retained user ID and the confirmation request to the terminal device 1 indicated by the login terminal information associated with the user ID.

In a case where the user indicated by the user ID has logged in or signed on, upon reception of the confirmation request and the user ID, the registration request processing unit 12b of the terminal device 1 transmits to the image forming apparatus 2 a response to the effect that the data destination information 13a associated with the user ID is effective. On the other hand, in a case where the user indicated by the user ID has not logged in or signed on, the registration request processing unit 12b of the terminal device 1 transmits to the image forming apparatus 2 a response to the effect that the data destination information 13a associated with the user ID is ineffective.

Based on the response, the registration processing unit 22c of the image forming apparatus 2 continues to retain the user ID and the data destination information 13a without any change if the data destination information 13a is effective, and if the data destination information 13a is ineffective, deletes the user ID and the data destination information 13a from the RAM 22a. Note that, if no response is returned after the elapse of a predetermined period of time since the transmission of the confirmation request, the registration processing unit 22c of the image forming apparatus 2 deletes the user ID and the data destination information 13a from the RAM 22a.

As described above, according to the third embodiment, in the case where the terminal device 1 does not receive data, the data destination information registered in the image forming apparatus 2 is deleted, with the result that fewer unnecessary destinations are included in the user list.

Note that each of the above embodiments is a preferred example of the present invention, but the present invention is not limited thereto, and various modifications and changes can be made within the scope that does not depart from the gist of the present invention.

For example, in each of the above embodiments, in the case where the communication channel 3 is a computer network, the File Transfer Protocol (FTP), electronic mail, a file system via a network, or the like can be used as the communication method adopted between the terminal device 1 and the image forming apparatus 2.

Further, in each of the above embodiments, after a user is identified as the destination of data, the data may be transmitted to an electronic mail address of the user.

Further, in each of the above embodiments, even after a user has logged out or signed off, the terminal device 1 may receive data transmitted to the user and store the data.

Further, in each of the above embodiments, the user list displayed on the display device 24 may be a list of only users (or user IDs), or may be a list of only the terminal devices 1 (or login terminal information). In that case, the user or the terminal device 1 to be the destination of the data is identified from the selected item if necessary.

Further, in each of the above embodiments, a magnetic card may be used instead of the IC card having the user ID. In that case, a magnetic card reader is used instead of the IC card reader.

Note that the present invention is applicable to, for example, an in-house network to which a plurality of terminal devices are connected and in which an image forming apparatus is shared thereby.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An information processing system, comprising:
   an image forming apparatus; and
   a plurality of terminal devices configured to communicate with the image forming apparatus,
   each one terminal device comprising:
   a first user identification processing unit configured to identify a user who operates the terminal device;

a registration request processing unit configured to transmit to the image forming apparatus: a registration request for data destination information indicating another user that is permitted to set the user identified by the first user identification processing unit as a destination of image data originated from the image forming apparatus; user identification information of the user identified by the first user identification processing unit; and a request to delete the registered data destination information indicating the another user for which the registration request has been made; and a reception processing unit configured to transmit transmission setting information to the image forming apparatus before receiving the image data, and to receive the image data according to the transmission setting information from the image forming apparatus, the image forming apparatus comprising:
a registration processing unit configured to receive the data destination information indicating the another user and the user identification information, to retain the data destination information indicating the another user in association with the user identification information, and to delete the data destination information indicating the another user upon reception of the request to delete the registered data destination information indicating the another user;

a second user identification processing unit configured to identify a user who operates the image forming apparatus;

a display device configured to display a user list based on the user identification information associated with the data destination information indicating the another user and including the user identified by the second user identification processing unit;

an input device configured to detect an operation for selecting a user to be the destination of the image data from the user list;

a destination identification processing unit configured to identify as the destination of the image data the plurality of terminal devices that have transmitted the user identification information of the user identified based on the operation; and a transmission processing unit configured to acquire the transmission setting information from the plurality of terminal devices identified by the destination identification processing unit before transmitting the image data, and to transmit the image data according to the transmission setting information to the plurality of terminal devices identified by the destination identification processing unit.

2. The information processing system according to claim 1, wherein the first user identification processing unit and/or the second user identification processing unit identifies a user based on the user identification information input at a time of login or sign-on.

3. The information processing system according to claim 2, wherein the user identification information is read from an IC card by an IC card reader.

4. The information processing system according to claim 1, wherein the data destination information indicating the another user is identified based on the user identification information of the another user selected from a list provided by a server or the user identification information of the another user input by the user.

5. The information processing system according to claim 1, wherein the transmission setting information comprises an image quality (resolution) of an original corresponding to the data, a file format, a size of the original, and/or a color thereof.

6. An image forming apparatus, which communicates with a plurality of terminal devices, comprising:
a registration processing unit configured to receive from the plurality of terminal devices a registration request for data destination information indicating another user that is permitted to set a given user as a destination of the image data originated from the image forming apparatus: and user identification information of the given user, to retain the data destination information indicating the another user in association with the user identification information, and to delete the data destination information indicating the another user upon reception from the plurality of terminal devices of the request to delete the registered data destination information indicating the another user for which the registration request has been made;

a user identification processing unit configured to identify a user who operates the image forming apparatus;

a display device configured to display a user list based on the user identification information associated with the data destination information indicating the another user and including the user identified by the user identification processing unit;

an input device configured to detect an operation for selecting a user to be the destination of the data from the user list;

a destination identification processing unit configured to identify as the destination of the image data the plurality of terminal devices that have transmitted the user identification information of the user identified based on the operation; and a transmission processing unit configured to acquire transmission setting information from the plurality of terminal devices identified by the destination identification processing unit before transmitting the image data, and to transmit the image data according to the transmission setting information to the plurality of terminal devices identified by the destination identification processing unit.

7. The image forming apparatus according to claim 6, wherein the registration processing unit retains the data destination information in a volatile memory in association with the user identification information.

8. The image forming apparatus according to claim 6, wherein the registration processing unit repeatedly confirms effectiveness of the retained data destination information and user identification information with respect to the terminal device, and ends retaining of the ineffective data destination information and user identification information.

9. The image forming apparatus according to claim 6, wherein the user list comprises the list that the user indicated by the user identification information associated with the data destination information including the user identified by the user identification processing unit and/or the list that the terminal device operated by the user indicated by the user identification information.

10. The image forming apparatus according to claim 6, wherein the user identification processing unit identifies a user based on the user identification information input at a time of login or sign-on.

11. The image forming apparatus according to claim 10, wherein the user identification information is read from an IC card by an IC card reader.

12. The image forming apparatus according to claim 6, wherein the input device comprises a key switch, a touch panel mounted to the display device and/or an IC card reader.

13. A terminal device, which communicates with an image forming apparatus, comprising:
- a user identification processing unit configured to identify a user who operates the terminal device;
- a registration request processing unit configured to transmit to the image forming apparatus: a registration request for data destination information indicating the another user that is permitted to set the user identified by the user identification processing unit as a destination of image data originated from the image forming apparatus; user identification information of the user identified by the user identification processing unit; and a request to delete the registered data destination information indicating the another user for which the registration request has been made; and
- a reception processing unit configured to transmit transmission setting information to the image forming apparatus before receiving the image data, and to receive the image data according to the transmission setting information from the image forming apparatus.

14. The terminal device according to claim 13, wherein the registration request processing unit transmits the registration request with regard to a user at a time of login of the user or sign-on of the user.

15. The terminal device according to claim 13, wherein the registration request processing unit transmits the registration request at a time of startup of a predetermined application program or a predetermined utility, and transmits a request to delete the registered data destination information at an end of the predetermined application program or the predetermined utility.

16. An information processing system, comprising:
- an image forming apparatus capable of receiving, transmitting, and printing image data; and
- a plurality of terminal devices configured to communicate with the image forming apparatus,
- each one terminal device of the plurality of terminal devices comprising:
  - a first user identification processing unit configured to identify a user who operates the one terminal device;
  - a registration request processing unit configured to transmit to the image forming apparatus a registration request for registering a list of other users that are permitted to set the user identified by the first user identification processing unit as a destination of image data originated from the image forming apparatus, the registration request including data destination information for each user among the listed other users in the registration request, and user identification information for each user among the listed other users in the registration request;
  - the registration request processing unit also configured to transmit to the image forming apparatus a de-registration request for de-registering a list of other users, requested by the user identified by the first user identification processing unit, to decouple the data destination information and the user identification information of a plurality of users previously registered by the image forming apparatus in a manner which removes permission to set the user identified by the first user identification processing unit as the destination of image data originated from the image forming apparatus; and
  - a reception processing unit configured to transmit transmission setting information to the image forming apparatus before receiving the image data, and to receive the image data according to the transmission setting information from the image forming apparatus,
- the image forming apparatus comprising:
  - a registration processing unit configured to receive from the one terminal device transmitting the registration request the data destination information and the user identification information for each user among the listed other users in the registration request, and to retain the received data destination information in correspondence with the received user identification information, respectively for each user among the listed other users;
  - the registration processing unit also being configured to receive, from the one terminal device transmitting the de-registration request including the user identification information for each user among the listed other users in the de-registration request, and to decouple the data destination information and the user identification information of the listed other users in the de-registration request in a manner which removes permission to set the user identified by the first user identification processing unit as the destination of image data originated from the image forming apparatus;
  - a second user identification processing unit configured to identify a user who operates the image forming apparatus;
  - a display device configured to display a user list based on the user identification information associated with the data destination information indicating the other users and including the user identified by the second user identification processing unit;
  - an input device configured to detect an operation for selecting a user to be the destination of the image data from the user list;
  - a destination identification processing unit configured to identify as the destination of the image data the plurality of terminal devices that have transmitted the user identification information of the user identified based on the operation; and
  - a transmission processing unit configured to acquire the transmission setting information from the plurality of terminal devices identified by the destination identification processing unit before transmitting the image data, and to transmit the image data according to the transmission setting information to the plurality of terminal devices identified by the destination identification processing unit.

* * * * *